March 7, 1933. W. J. BLIFFERT 1,900,272
INTAKE MANIFOLD
Filed Jan. 24, 1931 2 Sheets-Sheet 1
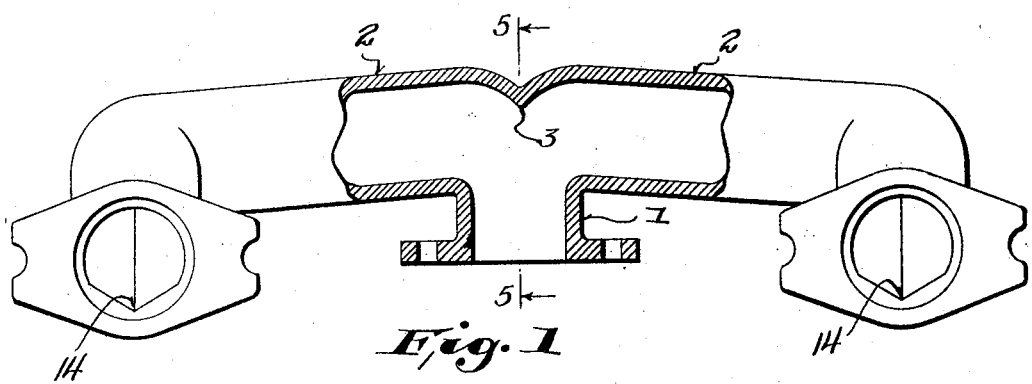
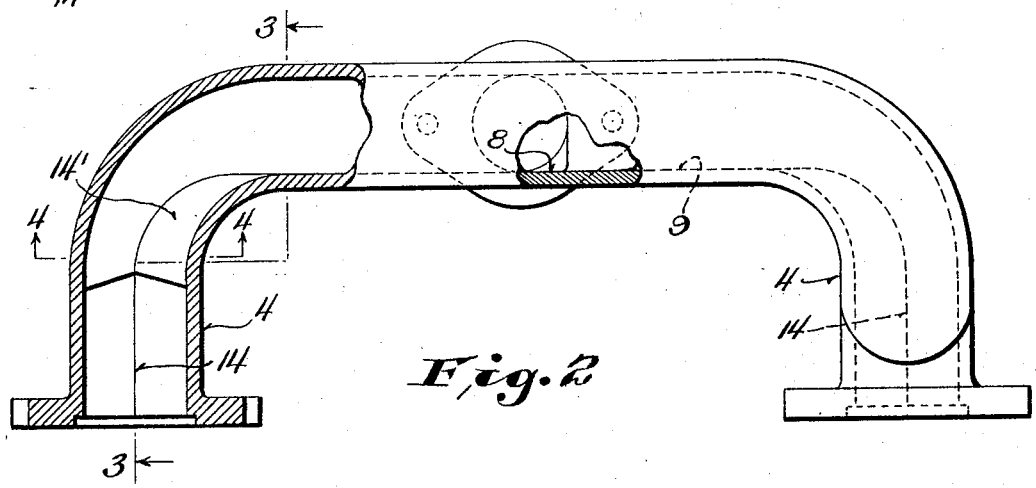
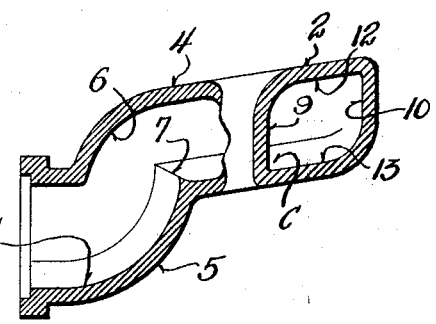
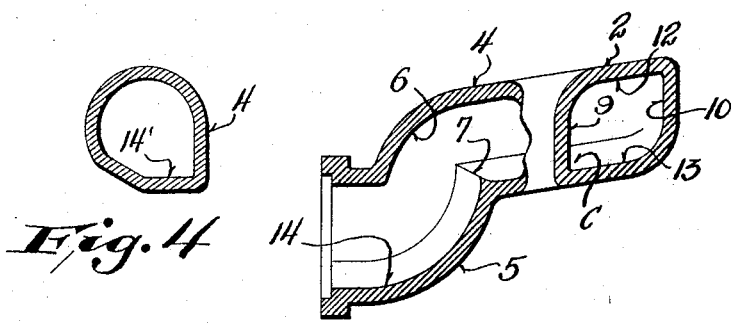
Inventor
Walter J. Bliffert
By Arthur R. Woolfolk
Attorney March 7, 1933. W. J. BLIFFERT 1,900,272
INTAKE MANIFOLD
Filed Jan. 24, 1931  2 Sheets-Sheet 2

Inventor
Walter J. Bliffert
By Arthur R. Woolfolk
Attorney

Patented Mar. 7, 1933

1,900,272

UNITED STATES PATENT OFFICE

WALTER J. BLIFFERT, OF MILWAUKEE, WISCONSIN

INTAKE MANIFOLD

Application filed January 24, 1931. Serial No. 510,879.

This invention relates to intake manifolds for internal combustion engines.

In intake manifolds as heretofore constructed difficulty has been experienced due to improper design and shaping of the manifold. The result of this is that it has been impossible to properly set the carburetor to supply the correct mixture for each of the cylinders. It has been found that some cylinders are overloaded, while other cylinders are supplied with too lean a mixture, with the consequence that the engine performance is very much interfered with.

One of the serious defects in the heretofore known types of manifolds is that quiet pockets are formed in the air stream above the fuel or rich mixture stream, particularly above the liquid fuel that condenses or forms due to the improper design of the manifold. In other words, one of the very serious defects has been that the condensed or liquid fuel forming in the manifold in the previously known types of manifolds collects at the bottom of the manifold out of the air stream and consequently the rapidly rushing air stream does not disturb this collected fuel.

It has been found that the fuel collects to a certain extent and thereafter may be delivered to the cylinders in a sudden abnormal volume so that the mixture is entirely too rich and may, under certain conditions, fail to ignite. Briefly stated, these defects arise primarily due to the fact that the fuel which condenses or collects in the manifold does not drain into the air stream, but that the air stream traverses a path separate and distinct from that occupied by the collected or accumulated fuel.

It is apparent therefore that acceleration of the engine is very much retarded and a sluggish action results. If the fuel delivered by the carburetor could be instantly carried directly to the cylinders, it is obvious that the engine would be substantially instantaneously responsive to variations in the setting of the throttle. However, as has been pointed out before, this is not the actual condition that obtains in the heretofore known types of manifolds.

This invention is designed to overcome the defects noted above and objects of such invention are to provide an intake manifold which is so constructed that the formation of quiet pockets above the mixture stream is eliminated, and instead any fuel which collects or condenses within the manifold drains down into the air stream so that it is picked up by this air stream and delivered to the cylinders in substantially instantaneous reponse to the change or setting of the throttle valve.

Further objects are to provide an intake manifold in which each of the cylinders receives the same charge, in which the fuel is not allowed to separate from the air stream, but in which the manifold is so designed that the fuel drains into the air stream, which latter follows the path of least resistance, this path of least resistance being located at identically the same place into which the collected fuel drains.

Further objects are to provide an intake manifold in which the fuel travel in the manifold is aided by gravity, in which any fuel collected by centrifugal action or by condensation drains down into the air stream, in which the manifold is so designed that the path of least resistance and the path of shortest travel for the air stream is at the bottom of the manifold to which point any collected fuel drains, and in which the construction is such that as the volume of the air stream decreases, its speed is still maintained at a relatively high value as the manifold is constricted towards its lower side so that, even at low speeds and during starting, a rapidly travelling air stream sweeps over all accumulated or collected fuel thereby securing an instant response to changes in the throttle and also insuring a steady uniform mixture and a steady carrying of the fuel into the cylinders.

Further objects are to provide an intake manifold in which a very short lift of the mixture is required, in which a leaner mixture may be used, in which there is no sluggishness, in which throughout the range from idling to wide open throttle there is no chance for fuel to collect out of the path of the air stream, in which the flow of fuel is assisted by gravity under normal conditions and even when the automobile is parked at a decided angle, and in which the fuel is delivered to the engine in a uniform manner at all times.

Embodiments of the invention are shown in the accompanying drawings, in which:—

Figure 1 is a side elevation, partly in section, of an intake manifold for an L-head engine.

Figure 2 is a plan view, partly in section, of the structure shown in Figure 1.

Figure 3 is a sectional view on the line 3—3 of Figure 2.

Figure 4 is a sectional view on the line 4—4 of Figure 2.

Figure 5:
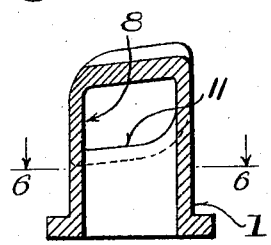
Figure 5 is a sectional view on the line 5—5 of Figure 1.
Figure 6:
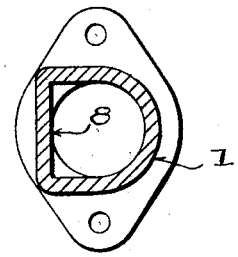
Figure 6 is a sectional view on the line 6—6 of Figure 5.

Referring to the drawings, particularly Figures 1 to 6, which show the intake manifold for L-head engines, it will be seen that the manifold comprises a riser 1, adapted for attachment to the carburetor, and a pair of main branches 2. It is to be noted particularly that the riser is very short thereby lessening the lift required and permitting the riser to be made of larger area as the speed of travel may be less due to a lessened height of lift. Further, it will be noted that the branches 2 slope downwardly on opposite sides of the riser, and that a cusp or dividing portion 3 is provided centrally over the riser to uniformly divide the mixture.

The main branches, or main pipes 2, continue downwardly to the short branches, or short pipes 4, which are designed for attachment at the intake ports of the engine, each of which usually feeds two cylinders. These short branches also continue downwardly so that the travel of fuel to the cylinders is assisted by gravity throughout the main and short branches.

The short branches 4 slant downwardly for their entire length and curve downwardly for the last half of their length, as shown most clearly in Figure 3. All portions of the main branches 2 and the first half of the short branches 4 are approximately in line with, or in reality slightly above the top of the outlet of the manifold, and the last, or outer half of the short branches 4 are above the bottom of the manifold outlet.

The bottoms of the short branches 4 are curved as indicated at 5 in Figure 3, and this portion of the short branches is provided with a curved or arched roof or upper portion 6. Further, as shown in Figure 3, a small, slightly upturned lip 7 is provided at the point where the short branch begins to curve downwardly.

The riser 1 is round adjacent its bottom, to fit the conventional carburetor, and gradually changes towards its top to provide a vertical face or wall 8 which form a continuation of the vertical walls 9 of the main branches 2, see Figures 2, 3, 4 and 5. These vertical walls are located on the motor side of the manifold.

The rear or outer walls of the main branches 2 are also vertical as indicated at 10 in Figure 3. Further, from Figure 4 it will be noted that the bottom edge 11 at which the riser joins the bottom wall of the main branches 2 is substantially straight and slants downwardly towards the motor side.

The upper and lower walls, 12 and 13, respectively, of the main branches 2, see Figure 3, slant downwardly towards the motor side of the manifold. This construction causes collected and condensed fuel, or fuel separated by centrifugal action, to drain downwardly towards the motor side of the main branches 2 into the corner indicated generally at C in Figure 3. Further, the air stream, taking the shortest path or path of least resistance, is drawn towards this corner at all engine speeds, even for very low speeds as in idling or at starting. Consequently, any collected or condensed fuel immediately drains downwardly directly into the air stream. It is to be noted also that any fuel collecting on the vertical side walls or on the top or on the bottom wall, drains downwardly towards the air stream and actually follows a very short path to get to the air stream.

Thus the fuel is swept along or directly picked up by the air stream. Any liquid fuel that may arrive at the lip 7, Figure 3, is sprayed upwardly through the air stream and, if any remains, it strikes the curved upper wall 6 against which at least a portion of the air stream strikes.

It is to be noted that the bottom of the outer half of the short branches 4 are V-shaped, as indicated at 14 in Figures 2 and 3, so that if any liquid fuel should arrive at this point, it will drain into the air stream and also be evenly fed to each of the two cylinders supplied from each of the outlets of the manifold. Further, it is to be noted from Figures 2 and 4, that a flat bottom wall 14' is provided for the inner half of each short branch 4 and that the air stream sweeps across this surface and picks up any fuel that may collect at this point.

If desired, the outlet portion of the short branches may gradually approximate a round, square or other shape at their extreme outer ends to fit a correspondingly shaped engine port where such a condition is met.

It will be seen that no quiet pockets can be formed, nor can the fuel remain out of the air stream irrespective of the speed at which the engine is operating, as the manifold is so constructed that the fuel drains down into the shortest path or path of least resistance taken by the air stream. Further, by providing the downwardly slanting corner C in the main branches 2 and the inner corner and V in the short branches 4, that even when the air stream is small, its velocity is high due to the constriction adjacent its path of least resistance or its shortest path through the manifold to the cylinders.

Figure 7:
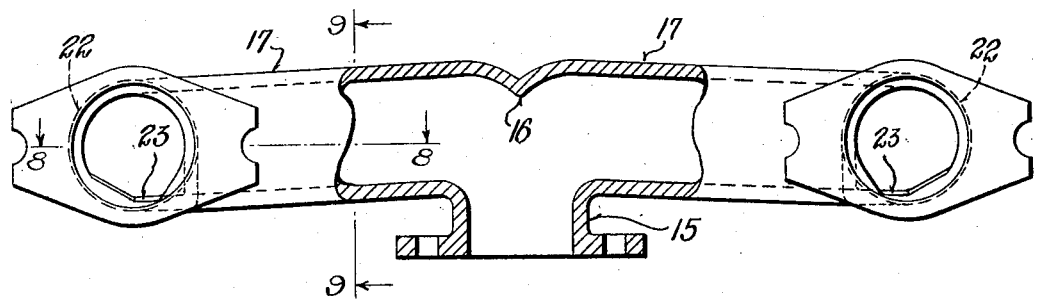
Figure 7 is a side elevation, partly in section, of an intake manifold, for an overhead valve engine.
Figure 8:
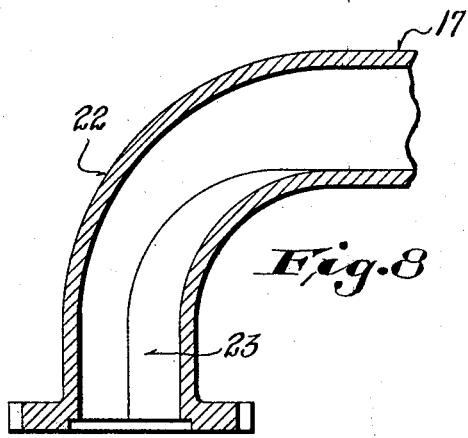
Figure 8 is a sectional view on the line 8—8 of Figure 7.
Figure 9:
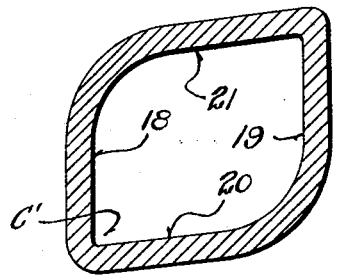
Figure 9 is an enlarged line section on the line 9—9 of Figure 7.

Figures 7, 8 and 9 show a further form of manifold, and it will be seen that a short riser 15 is employed and constructed as previously described, and that above this riser the centrally located cusp or division 16 is employed.

The main branches 17 slope downwardly towards the short branches 22 and are provided with vertical inner and outer walls 18 and 19, the inner wall being understood as the wall towards the motor side of the manifold, see Figure 8. The bottom and top walls 20 and 21 slant downwardly towards the motor side of the manifold so that any condensed or collected fuel will drain downwardly into the lowest corner indicated generally at C′ in Figure 8, and will thus drain downwardly into the shortest path or path of least resistance of the air stream, as previously described.

The short branches 22, see Figures 7 and 8, also slope downwardly, and are gradually curved, as shown in Figure 8. Each short branch is provided with a slanting outer side and a flat bottom 23 slanting towards the outlet end of the manifold so that even in these short branches any remaining liquid fuel drains downwardly into the air stream and also so as to insure an equal distribution of the fuel into each of the two cylinders fed from each of the outlets of the manifold and to prevent the air stream from having to rise at any point in its travel through the long and short branches of the manifold.

It is to be noted that the top of the riser wall and the bottom of the main and short branches 17 and 22, respectively, are approximately in line with or in reality slightly above the bottom of the outlet of the manifold at the engine intake port, so that any collected fuel flows downwardly, assisted by gravity, and both the air and fuel stream are at the bottom of the main and short branches.

This manifold may also have its outlet portion or outlet ports shaped to correspond with the shape of the inlet port of the engine to which it is attached and may gradually change, adjacent its ends to a round, square, or other shape as required.

It will be seen that in both forms of manifolds for L-head engines and for overhead valve engines, that the invention may be followed to produce a manifold in which there are no quiet pockets, in which all collected fuel from whatsoever cause drains directly into the rapidly passing air stream, in which each cylinder receives the same charge, in which the fuel cannot separate from the air stream and cannot be delivered to any cylinder or cylinders in a sudden surge or excess amount, but instead in which the fuel is uniformly fed to the cylinders in an even and smooth manner.

It will be seen further that due to the principles outlined above, that the engine employing this manifold will be instantly responsive to changes in the throttle, will run in an extremely smooth manner, and will be supplied with fuel of the proper uniform mixture throughout all speeds, from idling or starting to full speed.

It will be seen further that this invention may be employed in a manifold in a very simple manner, and that this device is eminently practical, is easy to construct, and has no fragile or delicate parts whatsoever, but instead is of relatively simple construction throughout.

Although this invention has been described in considerable detail, it is to be understood that such description is intended as illustrative rather than limiting, as the invention may be variously embodied and is to be interpreted as claimed.

I claim:

1. An intake manifold for an internal combustion engine comprising an elongated body portion having a pair of main branches extending in opposite directions from its center and having an inlet portion located at its center, a pair of short branches extending laterally from said main outlet portions towards the motor side of said manifold, said main branches each having a bottom wall and a top wall sloping downwardly towards the motor side, said main branches each having substantially vertical side walls.

2. An intake manifold for an internal combustion engine comprising an elongated body portion, lateral outlet portions projecting therefrom, and an inlet portion communicated with said body portion, said body portion being an approximate parallelogram in cross section with a lower corner sloping downwardly towards the motor side of the manifold.

In testimony whereof, the signature of the inventor is affixed hereto.

WALTER J. BLIFFERT.